United States Patent [19]
Golan et al.

[11] 3,937,250
[45] Feb. 10, 1976

[54] PRESSURE RELIEF ADJUSTMENT MEANS FOR CHECK VALVE

[75] Inventors: Kenneth F. Golan, Pekin; Larry W. Oetzel, Washington, both of Ill.

[73] Assignee: Caterpillar Tractor Co., Peoria, Ill.

[22] Filed: Aug. 19, 1974

[21] Appl. No.: 498,722

[52] U.S. Cl. ............ 137/543.17; 251/297; 74/531
[51] Int. Cl.² .................................. F16K 15/02
[58] Field of Search...137/535, 540, 543.17, 543.19, 137/524, 539, 539.5, 540.11, 543.13, 543.21; 251/215, 297, 214; 151/7; 74/531

[56] References Cited
UNITED STATES PATENTS

| 2,367,106 | 1/1945 | Dolch | 137/540 |
|---|---|---|---|
| 2,564,815 | 8/1951 | Raymond | 137/539.5 |
| 2,658,715 | 11/1953 | Kistnel | 137/454.6 X |
| 2,884,952 | 5/1959 | Mason et al. | 137/535 X |
| 2,963,038 | 12/1960 | Sharp | 137/454.6 |
| 3,272,218 | 9/1966 | Johnson | 137/540 X |
| 3,297,049 | 1/1967 | Moskovitz | 137/540 |
| 3,425,444 | 2/1969 | Jones | 137/540 |
| 3,443,579 | 5/1969 | Doolittle | 251/214 X |
| 3,602,340 | 8/1971 | Budzich | 251/297 X |

FOREIGN PATENTS OR APPLICATIONS

| 539,256 | 4/1957 | Canada | 251/214 |
|---|---|---|---|
| 938,984 | 10/1963 | United Kingdom | 137/540 |

Primary Examiner—William R. Cline
Attorney, Agent, or Firm—Phillips, Moore, Weissenberger Lempio & Strabala

[57] ABSTRACT

A check valve comprises a spring biased poppet reciprocally mounted in a housing thereof to normally close an inlet to the valve. A set screw is threadably mounted in an exposed position on the housing to selectively vary the spring load on the poppet to thus vary the pressure setting thereof. An annular elastomeric locking member circumvents the set screw and is compressed radially inwardly thereagainst by a clamping member, releasably attached on the housing, to retain the set screw in its preset position.

25 Claims, 4 Drawing Figures

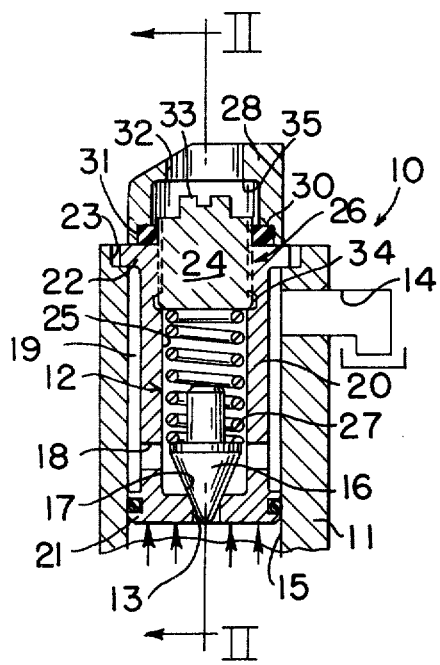
Fig_1_
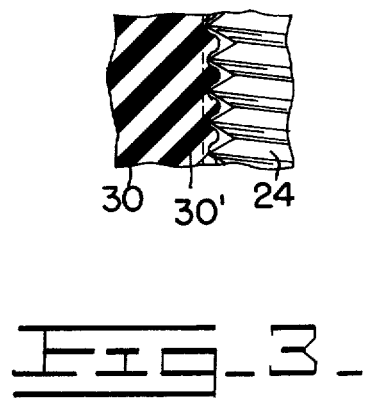
Fig_3_
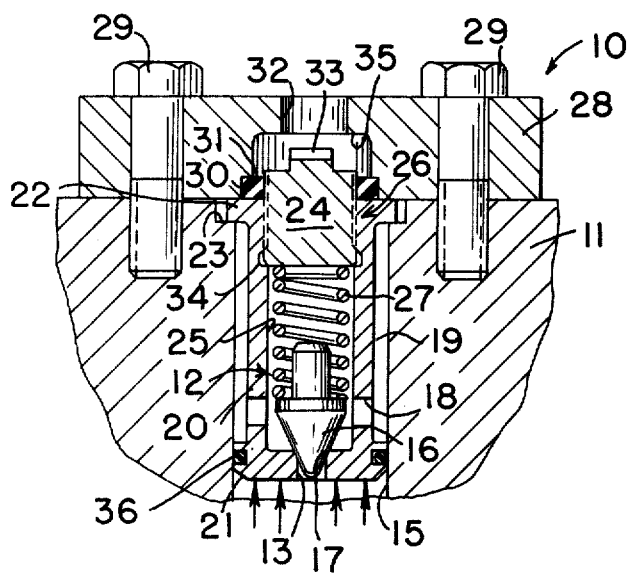
Fig_2_
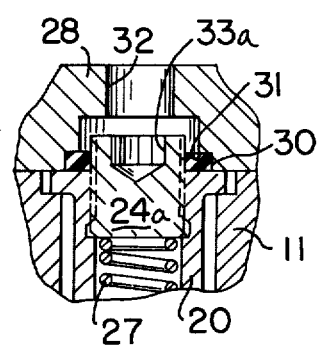
Fig_4_

PRESSURE RELIEF ADJUSTMENT MEANS FOR CHECK VALVE

BACKGROUND OF THE INVENTION

Check valves of the type having a spring biased poppet mounted therein are oftentimes employed as relief valves in fluid circuits to relieve excess fluid pressures. The pressure setting of the poppet may be changed, for example, by either employing springs having different spring rates or by employing means associated with the spring to provide such variance. However, such a change normally requires a complete dismantling of the valve and does not always assure the precisely held pressure setting required in sophisticated fluid circuits.

SUMMARY OF THIS INVENTION

An object of this invention is to provide an improved elastomeric locking means for an adjustment means, particularly adapted for selectively changing the pressure setting of a valve. The valve comprises a valve element, such as a poppet, and a spring mounted between the valve element and the adjustment means for setting the fluid pressure level at which the valve element opens. The adjustment means preferably comprises a set screw having the locking means compressed radially inwardly into frictional engagement with the threads thereof by a clamping member. As will be observed hereinafter, the locking and adjustment means teachings of this invention have broader applications wherein it is desired to move an adjusted member and hold it at a selected axial position.

BRIEF DESCRIPTION OF THE DRAWING

Other objects of this invention will become apparent from the following description and accompanying drawing wherein:

FIG. 1 is a longitudinal cross sectional view of a valve assembly employing the locking and adjustment means of this invention therein;

FIG. 2 is a sectional view thereof, taken in the direction of arrows II—II in FIG. 1;

FIG. 3 is an enlarged fragmentary view illustrating locked portions of the locking and adjustment means; and FIG. 4 is a fragmentary sectional view illustrating a modification of the FIGS. 1 and 2 valve assembly.

DETAILED DESCRIPTION

FIGS. 1 and 2 disclose a valve assembly 10 adapted to be integrated into a hydraulic fluid circuit to function as a relief valve therein. The valve assembly comprises a stationary housing member 11 having a check valve 12 reciprocally mounted therein to communicate pressurized fluid from an inlet 13 to an outlet 14 thereof when the pressure in a passage on a downstream side of the check valve, defined at a lower end of a bore 15, exceeds a predetermined level. The valve comprises a valve element or poppet 16 having its conically shaped lower end normally engaged with a like-shaped seat 17 at inlet 13 to normally prevent such communication.

Upon opening of the poppet, pressurized fluid flowing through inlet 13 will communicate with outlet or drain passage 14 via radial ports 18 and an annular passage 19. The inlet and ports are formed in a tubular sleeve 20, forming a separable cartridge and part of the valve's housing, having an annular piloting flange 21 formed at its lower end and an annular support flange 22 formed at its upper end. The piloting flange assures proper disposition of the sleeve in bore 15 whereas the support flange rests in a counterbore 23 formed on the housing. A seal 36 is provided on flange 21 to assure that all fluid in bore 15 flows through inlet 13.

An adjustment means, preferably in the form of a set screw 24, is threadably mounted in the upper end of a bore 25, formed in sleeve 20, by interengaging spiral threads 26. Spring means, such as a compression coils spring 27, is disposed between a lower end of the set screw and poppet 16. The spring functions to bias the conically shaped lower end of the poppet onto seat 17 is normally close inlet 13.

A clamping member or cover 28 is releasably attached on the housing by a pair of bolts 29 to overlie set screw 24. A deformable elastomeric locking means 30 is compressed radially between the clamping member and set screw 24 to lock the set screw in a predetermined axial position to thereby subject spring 27 to a predetermined preload. The locking means preferably comprises an annular member or ring composed of a suitable plastic material, preferably nylon, which will exhibit the required elastomeric and other physical characteristics required to render the ring reusable upon continued use thereof. For example, U.S. Pat. Nos. 2,450,694; 3,093,177; 3,294,139; 3,568,746; and 3,579,684 disclose elastomeric materials of this type.

In its relaxed state, ring 30 preferably comprises a generally rectangular cross section having an inside diameter 30' (FIG. 3) slightly larger than the outside diameter of the threads formed on set screw 24 to facilitate expeditious circumferential placement thereon. Upon clamping of member 28 on the housing, a flat bearing surface 31 of a counterbore, formed on the underside of member 28 to accommodate the ring which has a normal axial length slightly greater than the bore's depth, will function to compress the ring axially downwardly and radially inwardly to frictionally engage thread portions of the set screw. Should it become necessary to either increase or decrease the load on spring 27 to thus readjust the pressure setting of poppet 12, a workman need only rotate the set screw without releasing bolts 29.

Such rotation can be effected by projecting a screwdriver through an access opening 32, formed through member 28, and by engaging it with a slotted head 33 of the set screw. A first stop means or annular flange 34 is formed internally on sleeve 20 to limit the downward axial movement of the set screw, i.e., the maximum load on spring 27. An inner surface 35, formed on the underside of clamping member 28, provides a second stop means for limiting the upward movement of the screw to thus provide the minimum load on the spring.

FIG. 4 illustrates a modification of the FIGS. 1 and 2 valve assembly wherein identical numerals are employed to depict corresponding constructions. The numerals depicting modified constructions in FIG. 3 are accompanied by a subscript a.

In particular, an adjustment means or set screw 24a comprises a hex socket head 33a, adapted to be engaged and rotated by engagement with a suitable wrench projected through access opening 32 of clamping member 28. It should be noted that an annular elastomeric locking means or ring 30a also has an axial length in its relaxed state which is slightly longer than the depth of the above-described counterbore formed on member 28 to permit compression thereof both axially downwardly and radially inwardly by bearing surface 31. The elastomeric ring's mechanical and frictional engagement with the spiral threads formed on set screw 24a will thus substantially correspond to that illustrated in FIG. 3. Furthermore, compressed rings 30 and 30a will bear against a respective sleeve 20 to prevent rotation thereof.

We claim:

1. A valve defining an inlet and an outlet therein comprising
   a housing,
   a valve element mounted for axial movement in said housing,
   spring means mounted in said housing to urge said valve element into closing relationship with respect to said inlet,
   externally threaded adjustment means threadably mounted for axial movement in said housing to selectively vary the load on said spring means to thus vary the pressure of said valve element,
   a clamping member releasably clamped on said housing and having an access opening formed therethrough to overlie and expose said adjustment means, and
   an annular deformable elastomeric locking means compressed axially and radially inwardly under a pre-set clamping force by said clamping member and circumferentially into the external threads of said adjustment means for locking said adjustment means in a predetermined axial position whereby axial adjustment of said adjustment means may be effected by projecting a work tool through said access opening to engage and rotate said adjustment means.

2. The valve of claim 1 wherein said valve element constitutes a poppet.

3. The valve of claim 1 wherein said housing comprises a stationary housing member having a separable tubular sleeve mounted therein to define an annular passage therebetween to communicate said inlet with said outlet along with at least one radial port formed through said sleeve.

4. The valve of claim 3 wherein said sleeve comprises an annular piloting flange formed on a lower end thereof and an annular support flange formed on an upper end thereof and disposed in a counterbore formed on said housing member.

5. The valve of claim 1 wherein said spring means comprises a compression coil spring mounted between said valve element and said adjustment means.

6. The valve of claim 1 wherein said adjustment means comprises a set screw threadably mounted in said housing.

7. The valve of claim 6 wherein an upper end of said set screw has a tool engaging means formed on a head thereof and wherein said access opening exposes the head of said screw.

8. The valve of claim 1 wherein said elastomeric locking means constitutes a separate annular member disposed in a counterbore formed on an underside of said clamping member.

9. The valve of claim 8 wherein said elastomeric locking means constitutes a nylon composition.

10. The valve of claim 8 wherein an upper end of said counterbore is defined by a flat bearing surface engaging a top portion of said elastomeric locking means.

11. The valve of claim 1 further comprising first stop means formed on said housing to engage a lower end of said adjustment means to limit adjustment thereof axially downwardly towards said valve element.

12. The valve of claim 11 further comprising second stop means formed internally on said clamping member to engage an upper end of said adjustment means to limit axial movement thereof vertically upwardly away from said valve element.

13. A device comprising
    an adjusted member,
    adjustment means mounted for axial movement relative to a support member for selectively moving said adjusted member axially to an adjusted position,
    a clamping member releasably attached on said support member and having an access opening formed therethrough to overlie and expose said adjustment means and
    an annular deformable elastomeric locking means compressed axially and radially inwardly under a pre-set clamping force by said clamping means circumferentially into frictional engagement with said adjustment means for locking said adjustment means in a predetermined axial position whereby axial adjustment of said adjustment means may be effected by projecting a work tool through said access opening to engage and rotate said adjustment means.

14. The device of claim 13 further comprising spring means mounted axially between said adjustment means and said adjusted member whereby axial movement of said adjustment means will selectively vary the load on said spring means.

15. The device of claim 14 wherein said device comprises a valve and wherein said adjusted member constitutes a poppet.

16. The device of claim 15 wherein said support member comprises a stationary housing member having a separable tubular sleeve slidably mounted therein, said adjustment means, spring means and poppet mounted in said sleeve to form a separable cartridge therewith.

17. The device of claim 16 wherein said sleeve comprises an annular piloting flange formed on a lower end thereof and an annular support flange formed on an upper end thereof and disposed in a counterbore formed on said housing member.

18. The device of claim 14 wherein said spring means comprises a compression coil spring.

19. The device of claim 13 wherein said adjustment means comprises a set screw threadably mounted on said support member.

20. The device of claim 19 wherein an upper end of said set screw has tool engaging means formed on a head thereof and wherein said access opening exposes the head of said screw.

21. The device of claim 13 wherein said elastomeric locking means constitutes a separate annular member disposed circumferentially about said set screw and further disposed in a counterbore formed on an underside of said clamping member.

22. The device of claim 21 wherein said elastomeric locking means constitutes a nylon composition.

23. The device of claim 21 wherein an upper end of said counterbore is defined by a flat bearing surface engaging a top portion of said elastomeric locking means.

24. The device of claim 13 further comprising first stop means formed on said support member to engage a lower end of said adjustment means to limit adjustment thereof axially downwardly towards said adjusted member.

25. The device of claim 24 further comprising second stop means formed internally on said clamping member to engage an upper end of said adjustment means to limit axial movement thereof vertically upwardly away from said adjusted member.

* * * * *